(12) United States Patent
Eckert et al.

(10) Patent No.: US 9,895,957 B2
(45) Date of Patent: Feb. 20, 2018

(54) HEATING DEVICE FOR A VEHICLE AND METHOD OF OPERATING THE HEATING DEVICE

(71) Applicant: WEBASTO SE, Stockdorf (DE)

(72) Inventors: Daniel Eckert, Stockdorf (DE); Fritz Wegener, Gilching (DE); Florian Larisch, Zankenhausen (DE)

(73) Assignee: WEBASTO SE, Stockdorf (DE)

( * ) Notice: Subject to any disclaimer, the term of this patent is extended or adjusted under 35 U.S.C. 154(b) by 483 days.

(21) Appl. No.: 14/398,194

(22) PCT Filed: Apr. 29, 2013

(86) PCT No.: PCT/EP2013/058919
§ 371 (c)(1),
(2) Date: Oct. 31, 2014

(87) PCT Pub. No.: WO2013/164314
PCT Pub. Date: Nov. 7, 2013

(65) Prior Publication Data
US 2015/0090802 A1    Apr. 2, 2015

(30) Foreign Application Priority Data

May 2, 2012   (DE) .......................... 10 2012 207 305

(51) Int. Cl.
*B60H 1/22*   (2006.01)
*F24H 1/14*   (2006.01)
(Continued)

(52) U.S. Cl.
CPC ......... *B60H 1/2218* (2013.01); *B60H 1/2221* (2013.01); *B60H 1/2225* (2013.01);
(Continued)

(58) Field of Classification Search
CPC .. B60H 1/2221; B60H 1/2218; B60H 1/2225; B60H 1/2215; B60H 1/142;
(Continued)

(56) References Cited

U.S. PATENT DOCUMENTS 1,318,875 A * 10/1919 Hutchinson ............... F28F 3/12
                                                                165/170
1,399,052 A * 12/1921 Ellis .......................... F24D 1/00
                                                                237/12
(Continued)

FOREIGN PATENT DOCUMENTS

CN       2696126 Y      4/2005
CN       2842735 y      11/2006
(Continued)

OTHER PUBLICATIONS

"FR_2943296_A1_M—Machine Translation.pdf", machine translation, EPO.org, Mar. 20, 2017.*
(Continued)

*Primary Examiner* — Gregory Huson
*Assistant Examiner* — Daniel E Namay
(74) *Attorney, Agent, or Firm* — Quarles & Brady LLP (57) ABSTRACT

A heating device for a vehicle and a method for operating the heating device includes a flow path for a heat transport medium and an electrical heating arrangement for heating the heat transport medium on a heating section of the flow path. The heating section has at least two channels running in a serpentine pattern, through which the heat transport medium can flow in parallel.

14 Claims, 12 Drawing Sheets

(51) Int. Cl.
  *F24H 9/20* (2006.01)
  *F28F 3/12* (2006.01)
  *F24H 1/00* (2006.01)
  *F28F 13/12* (2006.01)
  *F24H 9/00* (2006.01)

(52) U.S. Cl.
  CPC ............. *F24H 1/009* (2013.01); *F24H 1/142* (2013.01); *F24H 9/0015* (2013.01); *F24H 9/2028* (2013.01); *F28F 3/12* (2013.01); *F28F 13/12* (2013.01); *B60H 2001/2237* (2013.01); *B60H 2001/2271* (2013.01); *B60H 2001/2296* (2013.01)

(58) Field of Classification Search
  CPC .... B60H 2001/2237; B60H 2001/2271; B60H 2001/2296; B60H 1/22; B60H 1/14; F24H 1/009; F24H 9/0015; F24H 9/2028; F24H 9/20; F28F 3/12; F28F 13/12; F28F 13/06
  USPC .................................................. 237/12, 12.3 R
  See application file for complete search history.

(56) References Cited

U.S. PATENT DOCUMENTS

| | | | | |
|---|---|---|---|---|
| 2,211,514 | A | * | 8/1940 | Newhall .................... F28F 3/12 165/115 |
| 2,244,475 | A | * | 6/1941 | Raskin .................. F25B 39/024 62/526 |
| 2,425,826 | A | * | 8/1947 | Radtke ...................... F28F 3/12 165/115 |
| 2,572,972 | A | * | 10/1951 | Baldwin ............... B30B 15/064 165/168 |
| 2,900,175 | A | * | 8/1959 | McGuffey ................. F28F 3/12 165/170 |
| 2,973,033 | A | * | 2/1961 | Patrick .................. B60H 1/2212 431/259 |
| 4,694,891 | A | * | 9/1987 | Okumura ................ B60S 1/481 165/41 |
| 5,983,997 | A | | 11/1999 | Hou |
| 6,093,909 | A | * | 7/2000 | Beetz .................... B60H 1/2221 219/202 |
| 6,286,331 | B1 | * | 9/2001 | Lee ....................... F25B 39/024 62/340 |
| 6,477,324 | B1 | * | 11/2002 | Sun ........................ F24H 1/142 165/172 |
| 8,463,117 | B2 | * | 6/2013 | Yeung .................... F24H 1/106 392/465 |
| 2006/0002088 | A1 | | 1/2006 | Bezama |
| 2006/0096738 | A1 | * | 5/2006 | Kang ...................... F28F 3/022 165/80.4 |
| 2009/0178792 | A1 | * | 7/2009 | Mori ........................ F28F 3/12 165/170 |
| 2010/0051234 | A1 | * | 3/2010 | Mori ...................... H01L 23/473 165/104.19 |
| 2010/0051235 | A1 | * | 3/2010 | Mori .................... H01L 21/4882 165/104.19 |
| 2010/0092163 | A1 | * | 4/2010 | Yeung ..................... F24H 1/106 392/441 |
| 2010/0096467 | A1 | * | 4/2010 | Kim .................... G05D 23/1919 237/12 |
| 2010/0175857 | A1 | * | 7/2010 | Gerstler ................. F28D 15/00 165/104.31 |
| 2010/0253923 | A1 | * | 10/2010 | Yanagisawa ............ F28D 15/00 353/54 |
| 2011/0180617 | A1 | * | 7/2011 | Saito .................... B60H 1/2221 236/49.3 |
| 2012/0037606 | A1 | | 2/2012 | Yao |
| 2012/0193339 | A1 | * | 8/2012 | Adachi ................ B60H 1/2221 219/202 |
| 2013/0026151 | A1 | * | 1/2013 | Adachi ................ B60H 1/2221 219/202 |
| 2013/0186883 | A1 | * | 7/2013 | Watanabe ............ B60H 1/2221 219/507 |
| 2013/0186966 | A1 | * | 7/2013 | Taguchi ............... B60H 1/2221 237/57 |
| 2014/0027444 | A1 | * | 1/2014 | Kohl .................... B60H 1/2221 219/629 |
| 2014/0126896 | A1 | * | 5/2014 | Wei ..................... B60H 1/2221 392/494 |

FOREIGN PATENT DOCUMENTS

| | | | | |
|---|---|---|---|---|
| DE | 19729725 | A1 | | 1/1999 |
| DE | 19912318 | A1 | | 9/2000 |
| DE | 10049030 | A1 | | 4/2002 |
| EP | 1 475 579 | A2 | | 11/2004 |
| FR | 2 943 296 | A1 | | 9/2010 |
| GB | 2 413 842 | A | | 11/2001 |
| JP | 60091192 | A | * | 5/1985 ................ F28F 3/12 |
| JP | H11 135241 | A | | 5/1999 |
| JP | 2002283826 | A | | 10/2002 |
| JP | 2004084488 | A | * | 3/2004 ........... F28D 1/0246 |
| JP | 2004162941 | A | | 6/2004 |
| JP | 2006097970 | A | * | 4/2006 ........... F28D 7/0016 |
| JP | 2006343027 | A | * | 12/2006 ............. F28F 3/027 |
| JP | 2008056044 | A | | 3/2008 |
| JP | 2010056131 | A | * | 3/2010 ........... H01L 23/473 |
| JP | 2011143780 | A | * | 7/2011 ............. F24H 1/009 |
| JP | 2011143781 | A | * | 7/2011 ............. F24H 1/121 |
| JP | 2012017031 | A | | 1/2012 |
| JP | 2012088034 | A | * | 5/2012 ................ H05B 3/24 |
| JP | 2012183978 | A | * | 9/2012 ......... B60H 1/00385 |
| WO | 2009069578 | A1 | | 6/2009 |

OTHER PUBLICATIONS

International Search Report dated Aug. 20, 2013 in connection with PCT/EP2013/058919.

* cited by examiner

HEATING DEVICE FOR A VEHICLE AND METHOD OF OPERATING THE HEATING DEVICE

CROSS-REFERENCE TO RELATED APPLICATIONS

This application represents the national stage entry of PCT International Application No. PCT/EP2013/058919 filed Apr. 29, 2013, which claims the benefit of German Patent Application 10 2012 207 305.1 filed May 2, 2012, both of which are hereby incorporated herein by reference for all purposes.

The invention relates to a heating device for a vehicle and to a method of operating a heating device in a vehicle.

Electric heating devices are used, for example, in motor vehicles as an auxiliary heating or as a park heating. An electric heating device usually comprises at least one electric heating unit for generating heat and for discharging generated heat to a heat transport medium. The heat transport medium may for example be water or another suitable heat transport liquid.

The electric heating unit may be connected to an electronic control unit that allows controlling the heating power of the heating unit. The electronic control unit may for example comprise a power transistor or a semiconductor-based electronic circuit, for example, for controlling an electrical current in the heating unit or for controlling a voltage applied at the heating unit. The power transistor may for example be a bipolar transistor with an isolated gate electrode (IGPT). The power transistor may be connected electrically in series with a heating element, for instance, a heating resistor. As a side effect, the electronic control unit typically generates heat which must be dissipated to prevent the control unit from overheating. For example, an air cooling may be provided for discharging the waste heat via admitted air. The electronic control unit may for instance be placed in an air duct through which air can flow. A blower, e.g., a fan, may be placed inside the duct in order to generate an air flow. The air preheated by the electronic control unit may be routed further through the heating unit to heat it further to the desired temperature. The heated air may then be routed further to its destination, e.g., into a passenger compartment of a vehicle.

It is an object of the invention to provide a compact, robust, energy-saving, and constructionally simple electric heating device. It is another object of the invention to describe an energy-efficient method of operating a heating device in a vehicle, which can be implemented in a constructionally simple manner.

These objects are solved by the features of the independent claims. The dependent claims describe improvements and advantageous embodiments.

Below, a heating device for a vehicle is described, comprising a flow path for a liquid heat transport medium and an electric heating unit for heating the heat transport medium on a heating section of the flow path.

The heating section may comprise at least two serpentine channels through which the heat transport medium can flow in parallel. The parallel connection of the channels, when compared against an alternative design with only a single serpentine channel or against a serial connection has the advantage that the pressure loss in the heat transport medium on the heating section is lower. A pump or other driving means for moving the heat transport medium can therefore be operated using less power and may therefore be less powerful. When compared against another alternative design in which several, that is at least two, straight channels are connected in parallel, the serpentine shape described herein has the advantage that it causes turbulence in the heat transport medium and thus prevents or delays overheating or boiling of the heat transport medium. The parallel connection of several serpentine channels is therefore a compromise between these two alternative embodiments, i.e., a compromise between a single serpentine channel and several straight channels connected in parallel. This compromise is favorable to turbulence and at the same time results in a relatively small pressure loss on the heating section.

The flow path may comprise an inlet section upstream of the heating section and an outlet section downstream of the heating section, wherein the channels branch off from the inlet section and discharge into the outlet section. The channels thus connect the inlet section to the outlet section. Thus, a common inlet section and a common outlet section are provided for the channels. This allows for a reduced number of components, e.g., in comparison to a group of identical heating devices which each comprise precisely one single channel.

The inlet section may be designed such that its cross sectional area diminishes in the direction of flow of the heat transport medium in accordance with the branch-offs of the channels. Analogously, the inlet section may be designed such that its cross sectional area increases in the direction of flow of the heat transport medium in accordance with the discharge points of the channels. It may thus be achieved that the pressure is approximately the same at each of the branch-off points. For example, the branch-off points and/or the discharge points may each be connected by a box which defines the inlet section and the outlet section, respectively. The box may be designed such that every channel experiences the same pressure. It may thus be envisioned that the box defining the inlet section (inlet box) narrows in the direction of flow. Similarly it may be envisioned that the box defining the outlet section (outlet box) widens in the direction of flow. The individual channels may be shaped identically. This may bring advantages for computing their geometry.

The inlet section and the outlet section may for example be elongated and extend parallel to each other. The volume between the inlet section and the outlet section thus has a constant traversal dimension, which is beneficial for the arrangement of the channels between the inlet section and the outlet section. It may be envisioned that the channels each branch off perpendicularly from the inlet section and discharge perpendicularly into the outlet section. This is favorable for generating turbulence at the branch-off points and at the discharge points. Furthermore, it allows for arranging an inlet and an outlet for the heat transport medium in a common plane, for example, on a front side of the heating device.

It may further be envisioned that each of the channels exhibits precisely 2*N hairpin curves, wherein N is a natural number. In this context, a hairpin curve is a curve with an angle between 150° and 180°. A hairpin curve thus causes a change of the flow direction of the heat transport medium by that angle. The total number of the hairpin curves being pair is favorable to a larger distance between the inlet section and the outlet section. This may simplify the geometry of the flow path.

The flow path may comprise an inlet upstream of the inlet section for admitting the heat transport medium into the heating device and an outlet downstream of the outlet section for discharging the heat transport medium from the heating device. The heating device can thus be used as a module in a heat circuit. The heat circuit may comprise further components or modules, such as an air heat exchanger for transferring heat from the heat transport medium to air to be heated and a driving device, e.g., a pump, for generating a flow of the heat transport medium.

In each of the channels, one or more rotation elements may be placed to generate a rotational motion of the heat transport medium flowing in the channel about a longitudinal axis of the channel. The respective rotation element is therefore capable of adding a rotational component to the flow. The rotation element may be a passive rotation element. That is, it may lack a driving means. The passive rotation element may be designed geometrically such that it transforms part of the translational kinetic energy of the heat transport medium into rotational kinetic energy.

The rotation element may further be designed to mix the heat transport medium in the channel. The rotation element may in other words be designed to generate turbulence in the heat transport medium. This is favorable for transferring heat from the heating unit to the heat transport medium.

The control unit may be provided with a heat discharge body for discharging waste heat from the control unit to the heat transport medium on an inlet section of the flow path upstream of the heating section. The inlet section forms a preheating section in this case. The waste heat from the electronic control unit is then mainly not transferred directly to the target medium to be heated (e.g., air to be supplied to a passenger compartment of the vehicle) but to the liquid heat transport medium. The construction volume required for this may be smaller, e.g., in comparison to an air cooling of the electronic control unit. An air duct, or other components for defining an air flow path inside the heating device, and a blower may be dispensed with. The heat discharge body may for example be arranged inside an inlet chamber for the heat transport medium or inside another flow region of the heat transport medium upstream of the heating section.

A sufficiently high rate of heat transfer from the electronic control unit via the heat discharge body to the heat transport medium may be assured by an appropriate dimensioning and geometrical shape of the heat discharge body in conjunction with an appropriate flow velocity of the heat transport medium. The heat transport medium, e.g., water, which flows past the heat discharge body may thus be prevented from boiling. Boiling of the heat transport medium at the heat discharge body may be undesired as it may cause bubbles to form at the heat discharge body, which may have a thermal isolation effect and which may thus impede the discharge of waste heat from the electronic control unit. An appropriate dimensioning and shaping of the heat discharge body however makes it possible that even in the case of boiling of the heat transport medium, bubbles forming at the heat discharge body are washed away with the flow of the heat transport medium. Therefore, the heat discharge body having a smooth (not rough) and/or a streamlined surface may be beneficial. While a rough, uneven, and not streamlined surface may have the advantage of generating turbulence of the heat transport medium at the surface, which is favorable for the flow of heat from the heat discharge body into the heat transport medium, it may in the case of boiling of the heat transport medium have the effect that bubbles which are forming remain stuck at the heat discharge body. If however the risk of boiling is negligible, a design of the surface of the heat discharge body that is favorable to turbulence may be the better option.

The heat discharge body may be oriented such that its flow resistance in the heat transport medium is minimum. The power required for moving the heat transport medium along the flow path, that is the power required for generating the flow of the heat transport medium, can be minimized in this manner. If for example a pump is used to drive the heat transport medium, a pump having a relatively low power and thus a relatively low consumption of energy may be used. Furthermore, the danger of bubbles forming at the heat discharge body may be reduced.

The heating device may be provided with an air heat exchanger for transferring heat from the heat transport medium downstream of the heating section to air. The air heat exchanger may for example comprise several channels for the heat transport medium and several channels for the air which are arranged proximate to each other to assure an optimal transfer of heat to the air. The heating device may further comprise a wall which defines the flow path in the preheating section at least partially, wherein the heat discharge body extends from the wall into the preheating section. The heat discharge body may for example be formed as a protrusion of the wall or as a pin, bolt, or fin. In addition, it may be envisioned for the heat discharge body to extend to an opposite part of the wall. The volume available in the preheating section can thus be used in an optimal manner. The heat discharge body may for example comprise two ends attached to opposite sides of the wall. This arrangement may be particularly robust. At each of the two ends an electronic control unit may be placed, if the heating device comprises several electronic control units. For instance, the heating device may comprise several electric heating units, for example, several heating resistors connected in parallel, each of which having an electronic control unit, e.g., a power switch, associated with it, respectively. The heat discharge body and the wall may be formed in a single piece. This may facilitate production of the heating device and assure high robustness. The heat discharge body and the wall may for example be made as a formed part from a suitable material having a high thermal conductivity. Alternatively, the heat discharge body may for example be made from a material having a high thermal conductivity, e.g., a metal, e.g., aluminum, and the wall may be made of a thermally isolating material, e.g., a plastic material or ceramics. The heat transfer between the heat discharge body and the heat transport medium may thus be optimized while the loss of heat via the wall to proximate components or to another environment, e.g., air, of the heating device may be minimized. As mentioned above, the heating device may comprise a second electronic control unit wherein the heat discharge body extends from the first control unit to the second control unit. The first control unit and the second control unit share a common heat discharge body in this case. Production costs can be reduced in this manner and robustness can be enhanced.

The heating device may further comprise a heat transfer unit for transferring heat from the heating unit to the heat transport medium in the heating section. Alternatively, the electric heating unit may be in direct contact with the heat transport medium. The heat transfer unit and the heat discharge body may be formed in a single piece. The component comprising the heat transfer unit and the heat discharge body may for example comprise a first group of fins and a second group of fins, wherein each group comprises at least one fin and the first group is arranged in the heating section of the flow path whereas the second group is arranged in the preheating section of the flow path. That is, the first group of fins may be considered the heat transfer unit or part of the heat transfer unit whereas the second group of fins may be considered the heat discharge body or part of the heat discharge body. Proximate fins may for example define a channel for the heat transport medium which is part of the flow path.

The heating device may further comprise a connecting piece which connects the heat transfer unit and the heat discharge body to each other and which extends along a non-straight line so that the thermal resistance between the heat transfer unit and the heat discharge body is increased in comparison to a shortest line. The flow of heat from the electric heating device to the electronic control unit may in this manner be minimized. The connecting piece may for example be formed as a corrugation or as several successive corrugations.

The mentioned non-straight line may for example be shaped as one of the following letters: L, U, V, S, Z, N, M, and W.

In the following description of the drawings, identical reference symbols refer to identical or comparable components.

FIGS. 1 to 5 show an electric heating device 10 for a vehicle, for instance for a motor vehicle or a mobile living or working container. The device 10 is represented in FIGS. 1 to 4 as open on its top side to reveal a view into an inner region of the device 10. The heating device 10 comprises a housing 12. A flow path for a liquid heat transport medium, e.g., water, is defined inside the housing 12. In the shown example, the flow path comprises the following sections in this order: an inlet 14, an inlet chamber 16 (inlet section), several channels 20 defined by a heat transfer unit 18, an outlet chamber 22 (outlet section), and an outlet 24. The channels 20 are connected in parallel and connect the inlet chamber 16 to the outlet chamber 22.

At least one heating unit 25 (shown in FIGS. 8 and 9) is integrated in or arranged on or under the heat carrier unit 18 and is mechanically connected to the heat carrier unit 18 so that the thermal resistance between the heating unit 25 and the heat transfer unit 18 is minimum. In the shown example, the heating device 10 comprises a plurality of electric heating units 25 (represented in FIGS. 8 and 9) and a corresponding number of electronic control units 26 (also schematically shown in FIGS. 8 and 9) for controlling the individual heating power of each of the heating units 25. Each heating unit 25 thus has a corresponding electronic control unit 26 associated with it. The heating unit 25 may comprise one or several heating elements. The heating unit 25 and the control unit 26 may for example be a heating resistor and a power transistor connected in series with the heating resistor. Alternatively, a group of several heating units 25 may have a shared control unit 26 associated with it. For example, an embodiment may be envisioned in which the group comprises all heating units 25 of the heating device 10 and in which this group is connected in series with a power switch 26 to control the combined power of the heating units 25. If several control units 26 are provided, these may be implemented in a single component. In the shown example, the control units 26 can each be contacted via at least two electrical contacts 30, for applying a supply voltage.

Each of the control units 26 is mechanically connected to a heat discharge body 28. The heat discharge body 28 serves to discharge waste heat from the electronic control unit 26 to the heat transport medium in the inlet chamber 16. The inlet chamber 16 is therefore also referred to as a preheating section of the flow path. Each control unit 26 may have one or more heat discharge bodies 28 associated with it. Alternatively, the several heat discharge bodies 28 may be considered a single larger heat discharge body. In the shown example, the heat discharge bodies 28 extend from the control units 26 into the inlet chamber 16 and the heat transport medium flows past them during operation of the heating device 10, whereby heat from the heat discharge bodies 28 is transferred to the heat transport medium. The heat discharge bodies 28 and hence the control units 26 are thus cooled while the heat transport medium is preheated. The preheated heat transport medium flows from the inlet chamber 16 further through the channels 20. Thereby it flows past the heat transfer unit 18, which defines the channels 20, and absorbs heat generated by the heating units 25. Each of the channels 20 or the channels 20 collectively are therefore also referred to as a heating section of the flow path. The heat transport medium thus heated then flows further through the outlet chamber 22 and leaves the heating device 10 through the outlet 24.

The heat discharge bodies 28 may for example each be formed as a fin having for instance a rectangular or V-shaped cross section, to discharge heat from the control unit, e.g., the power semiconductor, into the heat transport medium. The heat discharge body 28 therefore also serves for routing the heat transport medium. Alternatively, the heat discharge body 28 may for example be a cone, a bolt, or a pin to discharge heat from a spot below the respective control device, e.g., from below a relatively small chip area. Such a cone, bolt, or pin may further enhance turbulence of the heat transport medium and thus increase the discharge of heat. Overheating of the electronic control unit can thus be avoided and the waste heat from the control unit is used for heating the heat transport medium.

In the shown example the inlet section 16 is limited to the exterior by a wall 32 of the housing 12. The outlet section 22 is limited to the exterior by a wall 34 of the housing 12. The walls 32 and 34 each extend from the inlet 14 and the outlet 24, respectively, in a first direction and in a second direction, respectively, wherein the first and the second direction are inclined relative to two of the three principal axes of the housing 12, which is generally quad-shaped. The wall 32 thus causes the inlet section 16 to narrow in the flow direction (that is, in a direction away from the inlet 14). The wall 34 extends so that the outlet section 22 broadens in the flow direction, that is, in a direction toward the outlet 24. This causes the channels 20 to have approximately the same pressure of the heat transport medium.

Figure 1:
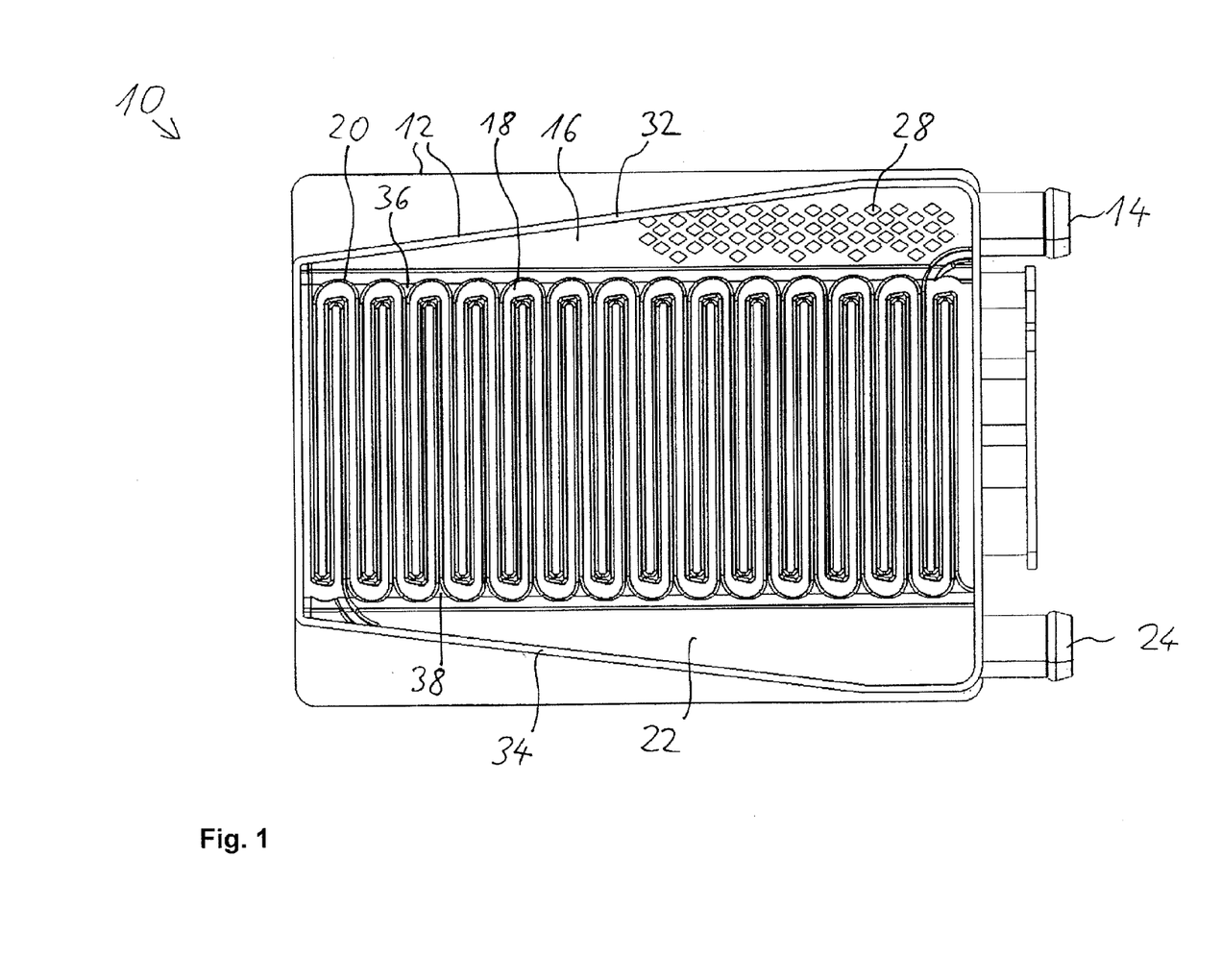
FIG. 1 shows a top view of an example of a heating device.
Figure 2:
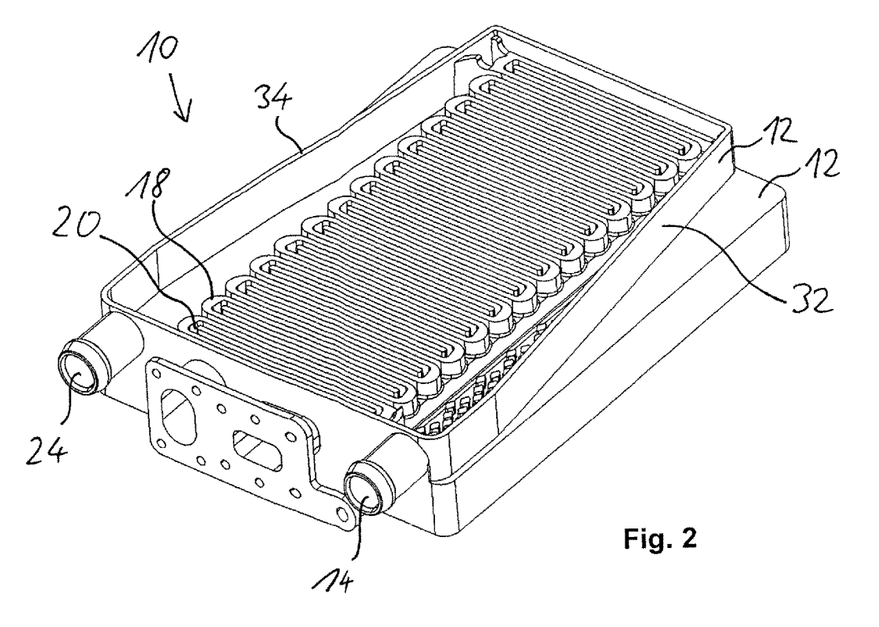
FIG. 2 shows a perspective view of the heating device of FIG. 1.
Figure 3:
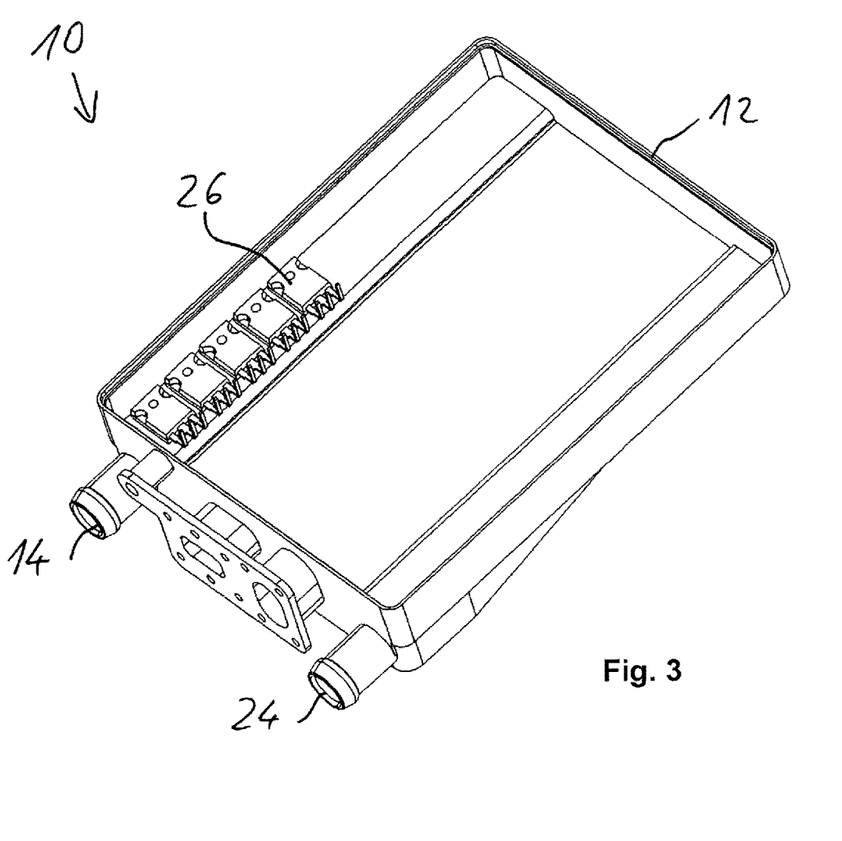
FIG. 3 shows a further perspective view of the heating device of FIG. 1.
Figure 4:
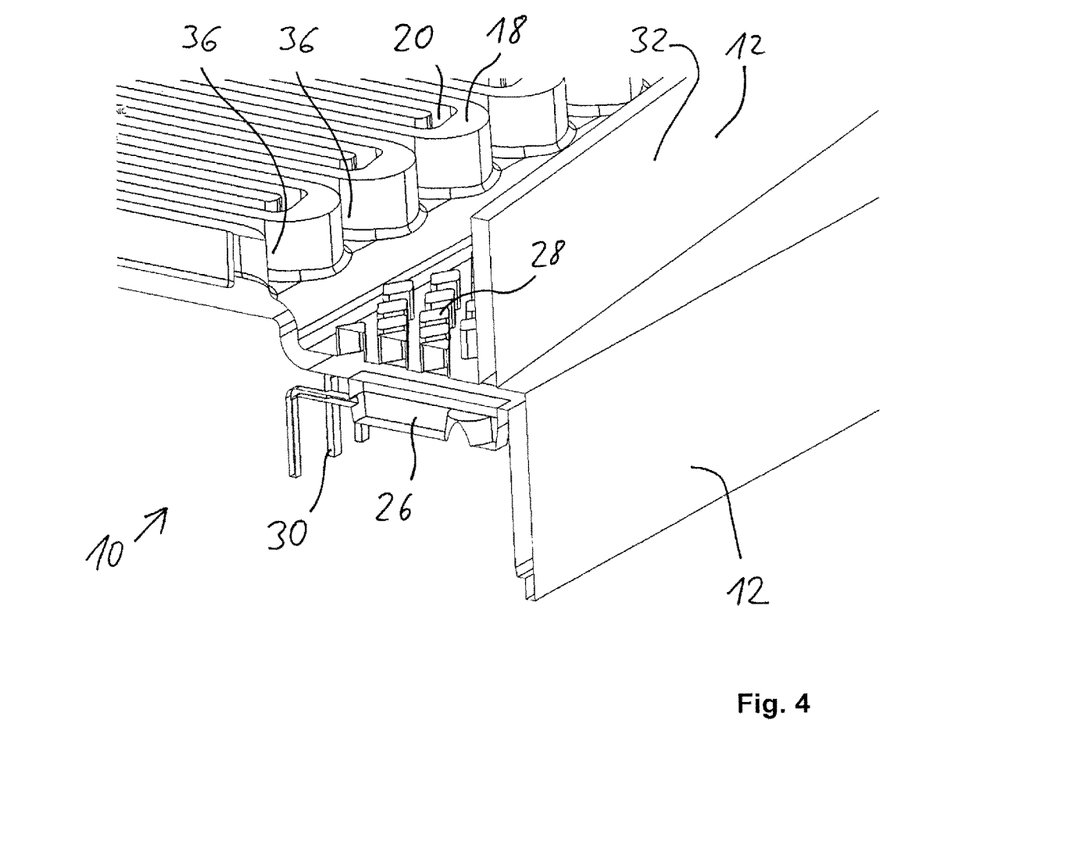
FIG. 4 shows a close-up view of the heating device of FIG. 1.
Figure 5:
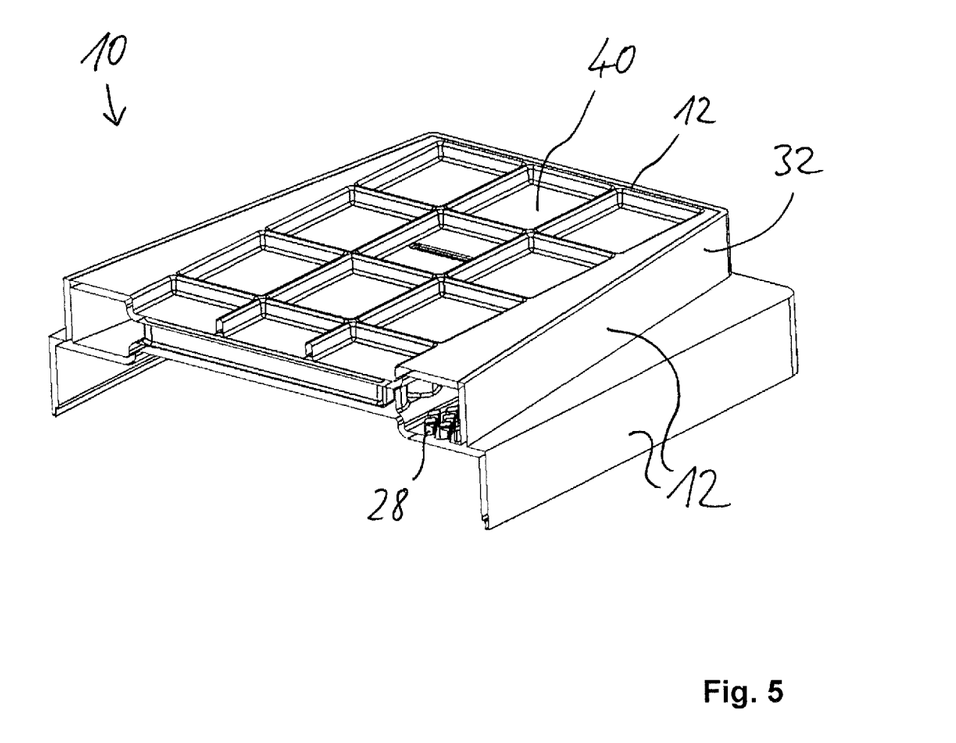
FIG. 5 shows a further perspective view of the heating device of FIG. 1.
Figure 6:
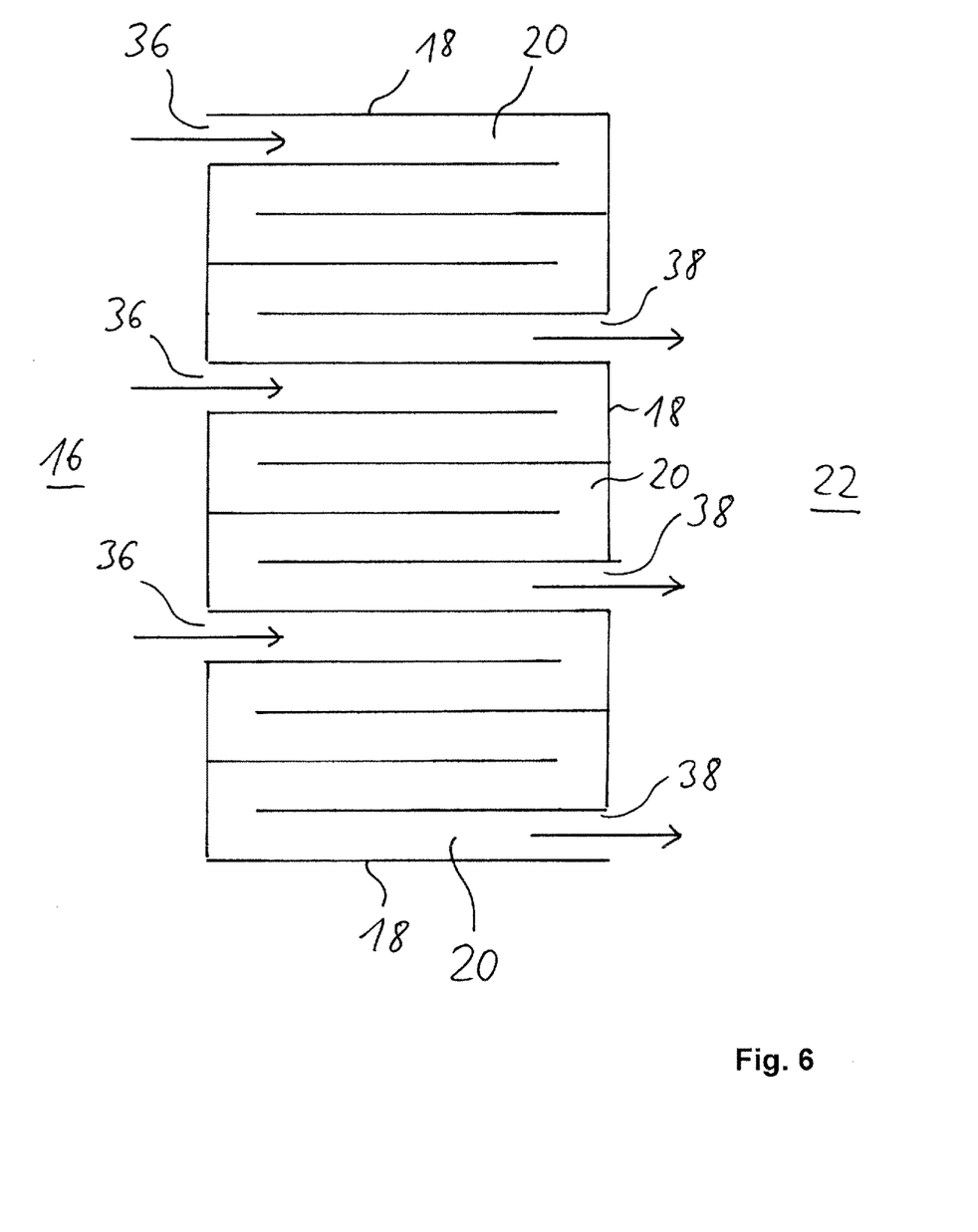
FIG. 6 shows a schematic representation of an example of a flow path.

The flow path defined by the heating unit 10 is further schematically illustrated in FIG. 6. In the shown example, the channels 20 are formed by an appropriately formed heat transfer unit 18. During operation, the heat transport medium flows simultaneously from the inlet section 16 via the branch-offs 36 and the individual channels 20 and is discharged into the outlet section 22 at the confluences 38. Each of the three shown channels 20 extends along a serpentine line and comprises for example four hairpin curves. The confluence 38 is therefore offset relative to the branch-off 36 of the same channel. In each channel 20, one or more mixing devices for increasing the heat flow from the heat transfer unit 18 into the heat transport medium may be arranged (see FIGS. 10 to 13).

Figure 7:
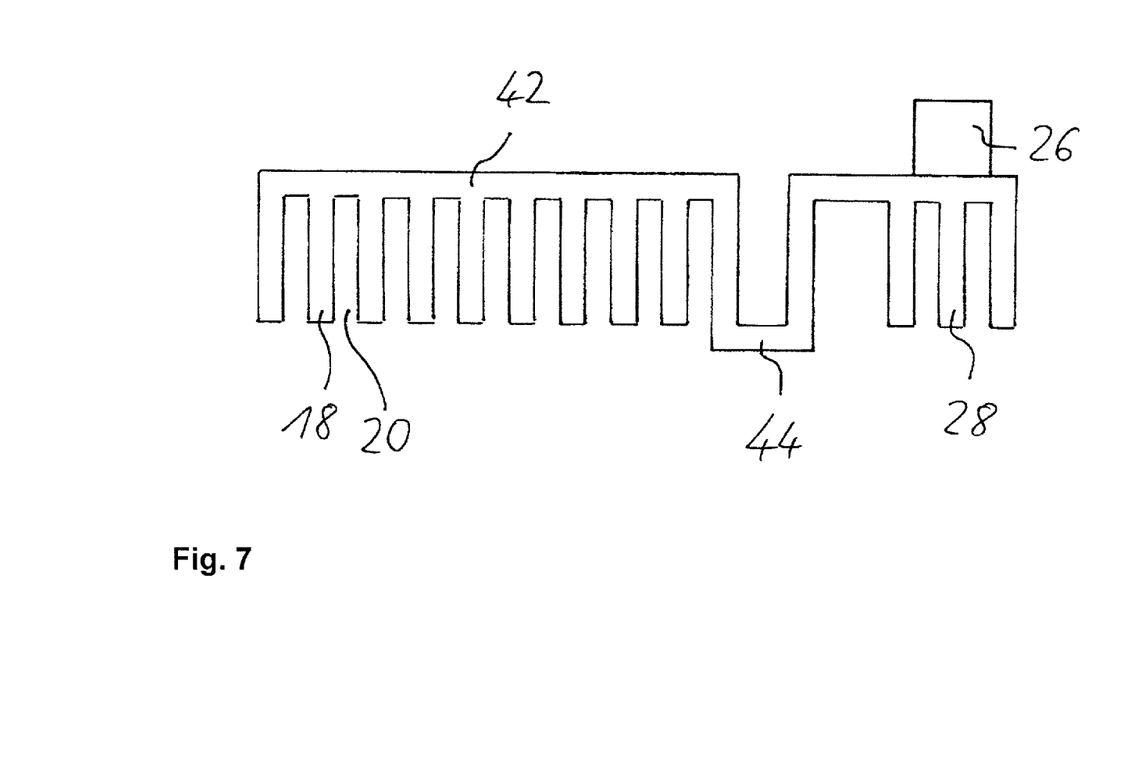
FIG. 7 schematically represents an example of a heat transfer unit having a heat discharge body for an electronic control unit.

FIG. 7 schematically shows a side view of an example of the heat transfer unit 18, the control unit 26 and the heat discharge body 28. In the shown example, the heat transfer unit 18 and the heat discharge body 28 each comprise a group consisting of several fins, which are also known as cooling fins and which serve for a rapid transfer of heat to the heat transport medium on the heating section and the preheating section, respectively, of the flow path. The heating unit 26, which may for instance be a semiconductor chip, may be attached to the heat discharge body 28. In the shown example, the heat transfer unit 18 and the heat discharge body 28 are formed in a single piece. They are connected to each other via a connecting piece 44 which extends along a non-straight line. Thus a compromise between simplicity in production and great robustness on the one hand and effective thermal isolation between the heat transfer unit 18 and the heat discharge body 28 on the other hand is achieved. It may be desired for the heat discharge body 28 to be thermally well isolated from the heat discharge unit 18, at least if the heating unit 25 (see FIGS. 8 and 9) which is in thermal contact to the heat transfer unit 18 is to reach a higher operating temperature than the control unit 26. In the shown example, the connecting piece 44 is substantially U-shaped. The connecting piece 44 is longer compared to a hypothetical straight connecting piece, given the same distance of the end points, and thus has a higher thermal resistance which reduces heating of the electronic control unit. The heat transfer unit 18 and the heat discharge body 28 are thus thermally decoupled from each other to a certain degree. In other words, given the same distance, which should be minimum, between the heat transfer unit 18 and the heat discharge body 28, the non-straight connecting piece results in a reduced flow of heat from the heating unit 25 to the control unit 26 in comparison to an equally possible straight connecting piece. A compact construction may thus be achieved, in which the heat transfer unit 18 (heating heat transfer unit) and the heat discharge body 28 (electronic heat transfer unit) may be implemented in a single component without too much heating the electronic control unit 26 by the heating unit 25.

Figure 8:
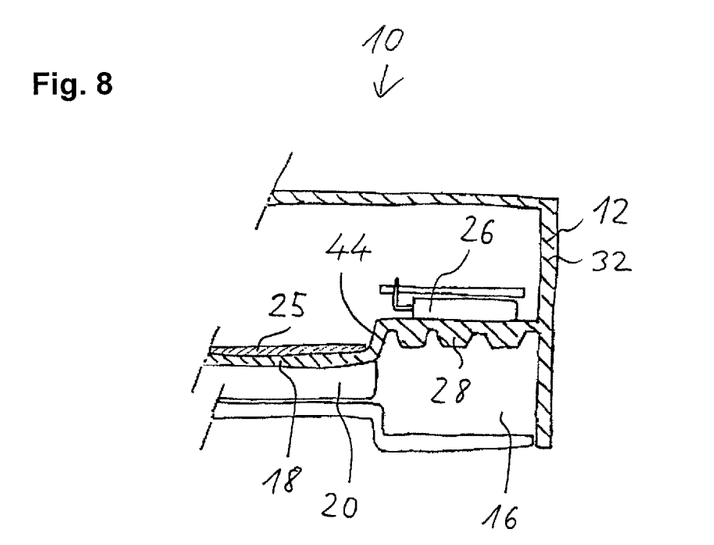
FIG. 8 shows a sectional view of an example of a heating device.

FIG. 8 shows an embodiment of the heating device 10 in which the heat transfer unit 18 and the heat discharge body 28 are connected to each other via a straight connecting piece 44.

Figure 9:
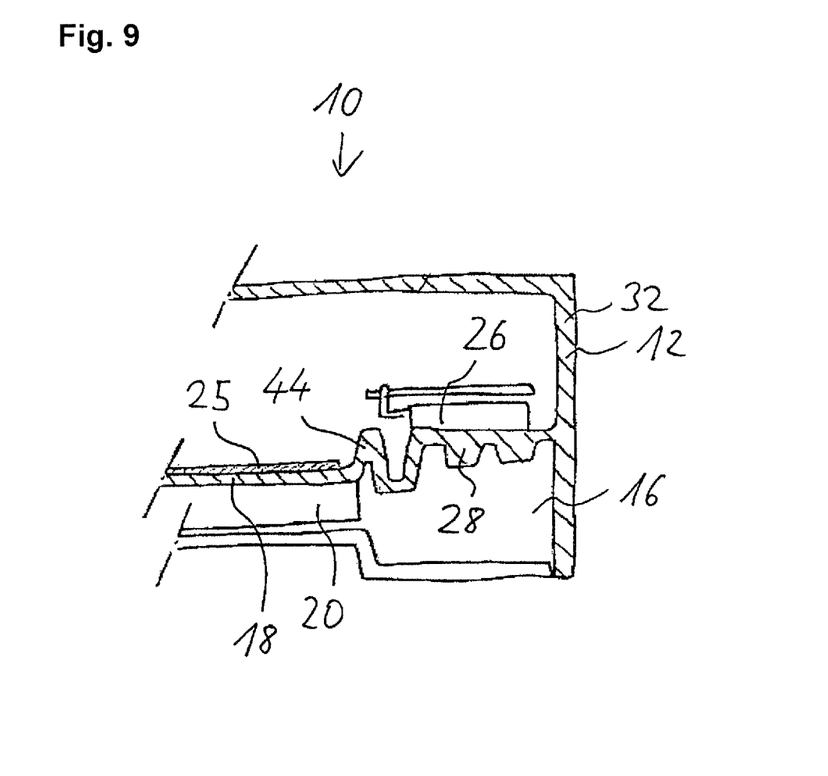
FIG. 9 shows a sectional view of another example of a heating device.

The embodiment schematically represented in FIG. 9 differs therefrom only in that the connecting piece 44 is non-straight, e.g., S-shaped, to achieve a better thermal isolation between the heat transfer unit 18 and the heat discharge body 28, given the same total volume of the heating device 10. The control unit 26 may be attached to the heat discharge body 28 by direct material connection to achieve a fast discharge of waste heat from the control unit 26 via the heat discharge body 28.

Figure 10:
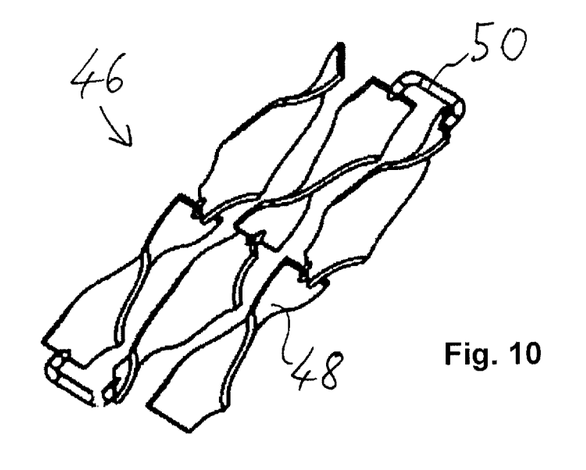
FIG. 10 shows an example of a mixing device.

FIG. 10 shows a first example of a mixing device 46. The mixing device 46 consists, for example, of several rotation elements 48 and one or more deflection elements 50 which together form a chain. The rotation elements 48 may each be screw-shaped or fan-shaped. Two immediately successive rotation elements 42 may have a rotational angle of, e.g., 90°, relative to each other, to mix different "packets" of the liquid transport medium.

Figure 11:
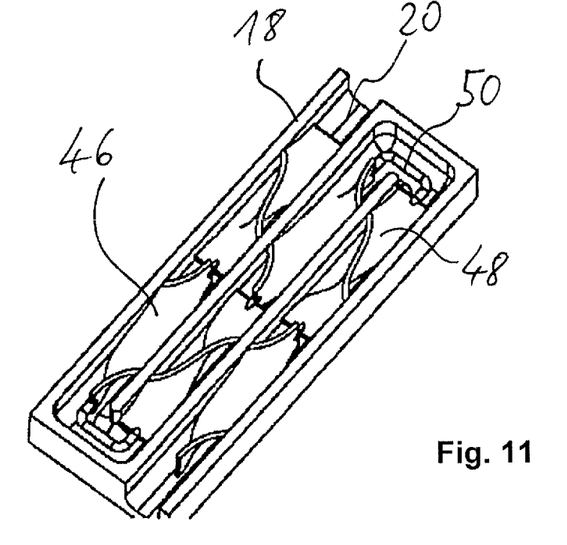
FIG. 11 shows the mixing device from FIG. 10 in a channel.

FIG. 11 shows one of the channels 20 from FIGS. 1 to 9 along with the mixing device 46. The mixing device 46, also referred to as a rotation chain, is placed in the channel 20. The deflection elements 50 are situated each at a respective hairpin curve of the channel 20. The rotation chain 46 may be rigid or immobile at least when placed in the channel 20. The rotation elements 48 and the deflection elements 50 do not necessarily consist of a material having a high thermal conductivity although this may somewhat improve the transfer of heat. The rotation elements 48 and the deflection elements 50 may for instance be made of a plastic material. The mixing device 46 is designed to impart rotation onto the flowing heat transport medium and to divide the heat transport medium once or repeatedly. The rotation can cause molecules of the heat transport medium to be routed to different temperature zones of the heat transfer unit and to tear a hot boundary layer at the wall of the channel. Each division of the flowing heat transport medium may mix molecules from different temperature zones.

For example a device as known from mixing jets for multiple-component adhesives may be used as the mixing device. In the implementation described herein, however, no different substances but different temperature regions of the same heat transport medium are mixed.

The total number of deflection elements 50 and their deflection angles (e.g., between 150° and 180°) may be varied in accordance with the shape of the channel 20. As the mixing device 46 itself replaces only a relatively small volume and may be streamlined, for example, it is possible to avoid flow cut-offs and dead water regions. The additional pressure loss resulting from the mixing device 46 may therefore be very small while significantly increasing the flow of heat.

Figure 12:
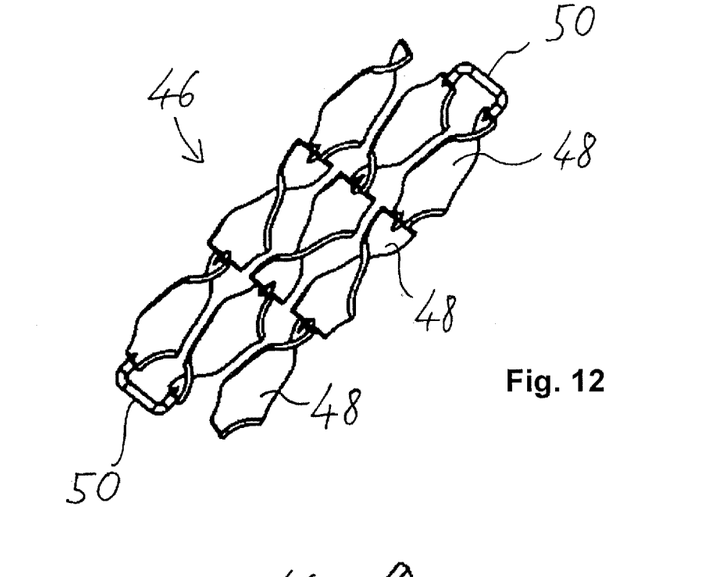
FIG. 12 shows another example of a mixing device.
Figure 13:
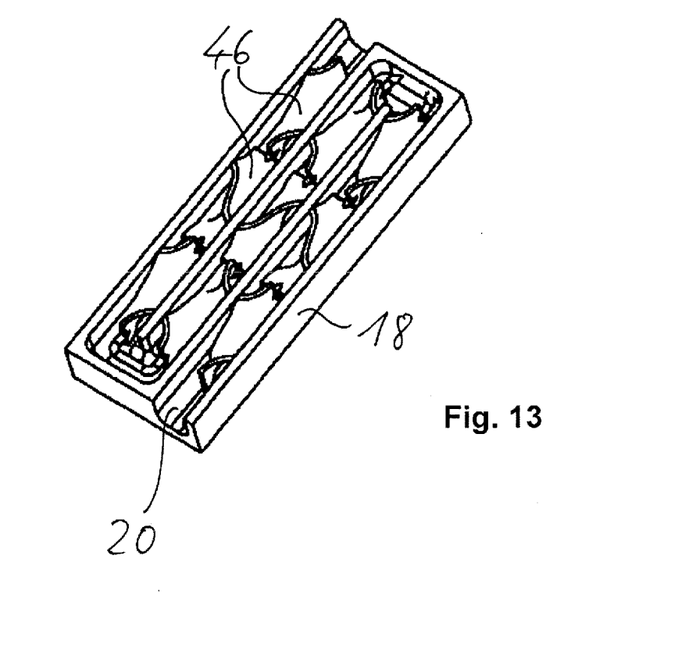
FIG. 13 shows the mixing device from FIG. 12 in a channel.

FIGS. 12 and 13 show a further example of such a mixing device 46.

Figure 14:
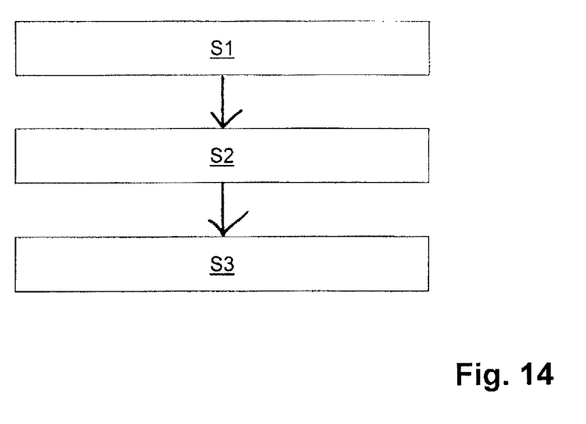
FIG. 14 shows a flow chart.

The flow diagram in FIG. 14 illustrates a mode of operation of the heating device 10. In block S1, the heating device 10 is switched on. For example a pump (not shown) may be switched on to drive the heat transport medium along the flow path. At the same time or before or after this, the electronic control unit 26 may be actuated so that the heating unit 25 is supplied with an electrical current to generate heat. The electric heating unit 25 thus discharges heating heat to the heat transport medium on the heating section of the flow path (block S2). Before that, the heat transport medium, which flows past and around the heat discharge body 28, absorbs waste heat from the control unit 26 via the heat discharge body 28, whereby the control unit 26 is cooled and the heat transport medium is preheated. In block S3, the heating device 10 is switched off.

The features of the invention disclosed in the preceding description, in the drawings, and in the claims may be relevant, individually as well as in any combination, for carrying out the invention.

LIST OF REFERENCE SYMBOLS 10 heating device
12 housing 14 inlet
16 inlet chamber
20 channel
22 outlet chamber
24 outlet
25 heating unit
26 control unit
28 heat discharge body
30 electrical contact
32 wall
34 wall
36 branch-off
38 confluence
40 top wall
42 heat transfer unit
44 connecting piece
46 mixing device
48 rotation element
50 deflection element

The invention claimed is:

1. A heating device for a vehicle, said heating device comprising
a flow path for a liquid heat transport medium, and
an electric heating unit having a heating resistor for heating the heat transport medium in a heating section of the flow path, said heating section including at least two serpentine channels connected in parallel through which the heat transport medium flows in parallel, in which the flow path includes an inlet section upstream of the heating section and an outlet section downstream of the heating section, wherein the channels branch off from the inlet section and discharge into the outlet section.

2. The heating device of claim 1, in which a cross sectional area of the inlet section decreases in the direction of flow of the heat transport medium in accordance with the branch-offs of the channels.

3. The heating device of claim 1, in which the inlet section and the outlet section are elongated and extend parallel to each other.

4. The heating device of claim 1, in which each channel branches off perpendicularly from the inlet section and discharge perpendicularly into the outlet section.

5. The heating device of claim 1, in which each of the channels includes precisely 2*N hairpin curves wherein N is a natural number.

6. The heating device of claim 1, wherein the flow path further includes an inlet upstream of an inlet section admitting the heat transport medium into the heating device, and an outlet downstream of an outlet section discharging the heat transport medium from the heating device.

7. The heating device of claim 1, wherein at least one of the channels includes at least one rotation element generating rotation of the heat transport medium which flows in the at least one of the channels, said rotation being about a longitudinal axis of the at least one of the channels.

8. The heating device of claim 7, wherein the rotation element mixes the heat transport medium inside the channel.

9. The heating device of claim 1, including an electronic control unit controlling the heating device, wherein the control unit includes a heat discharge body discharging waste heat from the control unit to the heat transport medium in an inlet section of the flow path.

10. The heating device of claim 9, including a heat transfer unit transferring heat from the heating unit to the heat transport medium in the heating section, wherein the heat transfer unit and the heat discharge body are a single piece.

11. The heating device of claim 10, including a connecting piece interconnecting the heat transfer unit and the heat discharge body, said connecting piece extending along a non-straight line so that thermal resistance between the heat transfer unit and the heat discharge body is increased in comparison to a straight line.

12. The heating device of claim 11, wherein the non-straight line is shaped as an L, U, V, S, Z, N, M, or W.

13. The heating device of claim 10, wherein the heat transfer unit at least partially defines the channels.

14. A method of operating a heating device according to claim 1 in a vehicle, said method comprising:
heating a liquid heat transport medium flowing simultaneously through at least two serpentine channels of a heating device, said channels being connected flow-technically in parallel to each other, the heat transport medium being heated by an electric heating unit of the vehicle that comprises a heating resistor.

* * * * *